United States Patent
Uchida et al.

(10) Patent No.: US 7,657,719 B2
(45) Date of Patent: Feb. 2, 2010

(54) CONTROLLER FOR A COPY OPERATION BETWEEN A HOST COMPUTER AND HARD DISKS, A CONTROL METHOD THEREOF, AND A RECORDING MEDIUM STORING A PROGRAM FOR EXECUTING THE CONTROL METHOD

(75) Inventors: Koji Uchida, Kawasaki (JP); Hideaki Omura, Kawasaki (JP); Tsutomu Akasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 11/394,221

(22) Filed: Mar. 31, 2006

(65) Prior Publication Data
US 2007/0143554 A1    Jun. 21, 2007

(30) Foreign Application Priority Data
Dec. 19, 2005    (JP) ............................. 2005-365545

(51) Int. Cl.
G06F 12/16    (2006.01)
(52) U.S. Cl. ....................................... 711/162; 711/114
(58) Field of Classification Search .................... None
See application file for complete search history.

(56) References Cited

U.S. PATENT DOCUMENTS

| | | | |
|---|---|---|---|
| 6,880,052 B2 * | 4/2005 | Lubbers et al. ............. | 711/162 |
| 7,185,227 B2 * | 2/2007 | Eguchi et al. ................ | 714/15 |
| 2006/0069865 A1 * | 3/2006 | Kawamura et al. ......... | 711/114 |
| 2007/0088977 A1 * | 4/2007 | Eguchi et al. ................ | 714/6 |

FOREIGN PATENT DOCUMENTS

| JP | 62-257553 | 11/1987 |
|---|---|---|
| JP | 05-187498 | 7/1993 |
| JP | 07-261938 | 10/1995 |
| JP | 8-278908 | 10/1996 |
| JP | 2000-330729 | 11/2000 |
| JP | 2001-166974 | 6/2001 |
| JP | 2002-163154 | 6/2002 |
| JP | 2004-342050 | 12/2004 |

OTHER PUBLICATIONS

Japanese Office Action dated Nov. 24, 2009 in corresponding Japanese Patent Application No. 2005-365545.

* cited by examiner

Primary Examiner—Kevin Verbrugge
(74) Attorney, Agent, or Firm—Staas & Halsey LLP

(57) ABSTRACT

A disk array device includes a controller that sets a session pertaining to a copy source disk and a copy destination disk, and without copying the entire data that is recorded in the copy source disk to the copy destination disk, copies to the copy destination disk only the data that is recorded in a data space for writing. Further, if data for reading does not exist in the copy destination disk, the controller searches data from the copy source disk and transfers the searched data to a host computer.

6 Claims, 13 Drawing Sheets

FIG.4
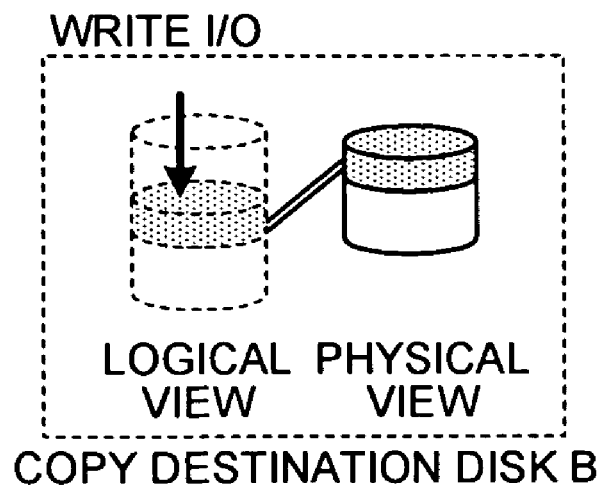
COPY DESTINATION DISK B
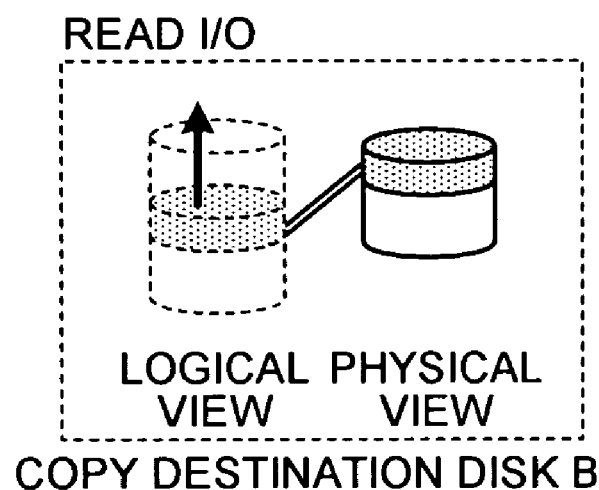
COPY DESTINATION DISK B
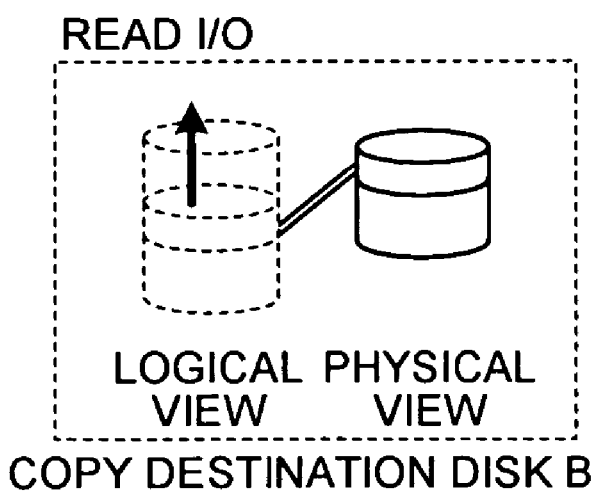
COPY DESTINATION DISK B

| | |
|---|---|
| COPY SOURCE LUN | |
| COPY DESTINATION LUN | |
| COPY SOURCE COPYING START LBA | |
| COPY DESTINATION COPYING START LBA | |
| COPYING LBA NUMBER | |
| COPY STATUS CONTROL BITMAP | |

120b

| LOGICAL LBA | PHYSICAL LBA | WRITE IDENTIFIER |
|---|---|---|
| 0 | - | AFTER SETTING |
| 1 | 1 | AFTER SETTING |
| 2 | 0 | BEFORE SETTING |
| ⋮ | ⋮ | ⋮ |
| N | M | BEFORE SETTING OR AFTER SETTING |

CONTROLLER FOR A COPY OPERATION BETWEEN A HOST COMPUTER AND HARD DISKS, A CONTROL METHOD THEREOF, AND A RECORDING MEDIUM STORING A PROGRAM FOR EXECUTING THE CONTROL METHOD

BACKGROUND OF THE INVENTION

1. Field of the Invention

The present invention relates to a technology for taking backup of data.

2. Description of the Related Art

A known technique in which redundant data is stored in a plurality of Hard Disk Drives (HDDs) enables protection of data, because if data in one HDD is lost, it can be recovered from other HDD.

However, recently, there has been a substantial increase in the amount of data that needs to be stored in HDDs. Consequently, the time required for backup of the data has also increased substantially. Thus, there is a need of a technology that can efficiently perform the backup operation. Japanese Patent Publication No 2001-166974 discloses an advanced copy function, in other words, a Point-in-Time (PIT) copy function to carry out backup of data.

FIG. 14 is a schematic for explaining the advanced copy function. A destination disk is prepared that has the same amount of storage capacity as the amount of source data to be copied. Then the entire source data is transferred from a source disk to the destination HDD. Finally, the data in the destination disk is used to perform backup. Once the source data is transferred from the source disk to the destination disk, the source disk and the destination disk can be logically separated from each other, so that other operations can be performed while data is being backed up from the destination disk. However, because it is necessary to prepare the destination disk, it leads to increased costs. Moreover, if there are a large number of HDDs that are to be backed up, the same number of destination disks are also required, which leads to further increase in the costs.

In other words, there is a need of a technology that supports the advanced copy function but that is inexpensive.

SUMMARY OF THE INVENTION

It is an object of the present invention to at least solve the problems in the conventional technology.

According to an aspect of the present invention, a controller that controls copying of data from a source medium to a destination medium, the destination medium having a storage capacity that is logically equivalent to and physically smaller than that of the source medium, includes an extracting unit that extracts, upon fetching an update request to update first data from among the data in the source medium, the first data from the source medium; and a copying unit that searches for a free space in the destination medium and copies the first data sequentially from a head address of the free space thereby copying the first data from the source medium to the destination medium.

According to another aspect of the present invention, a method of controlling copying of data from a source medium to a destination medium, the destination medium having a storage capacity that is logically equivalent to and physically smaller than that of the source medium, includes extracting, upon fetching an update request to update first data from among the data in the source medium, the first data from the source medium; and searching for a free space in the destination medium and copying the first data sequentially from a head address of the free space thereby copying the first data from the source medium to the destination medium.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic for explaining the behavior of a copy destination disk before session setting;

DETAILED DESCRIPTION OF THE PREFERRED EMBODIMENTS

Exemplary embodiments of the present invention are explained next with reference to the accompanying drawings.

Figure 1:
FIG. 1 is a schematic for explaining the concept of the present invention.

FIG. 1 is a schematic for explaining the concept of the present invention. The source data is not copied in its entirety from a copy source disk to a copy destination disk, but only the source data that has been updated or changed is transferred from the copy source disk to the copy destination disk. The data is then transferred from the copy destination disk to an external recording device, such as a tape, thereby taking a backup of the data. In this manner, the present invention supports the advanced copy function (One Point Copy (OPC)) and requires a copy destination disk having a lesser amount of storage capacity than that of the conventional technique.

Although the copy source disk contains a large amount of data, generally, only a part of that is updated or changed. Accordingly, in the present invention, only the data that has been updated or changed is copied from the copy source disk to the copy destination disk.

Figure 2:
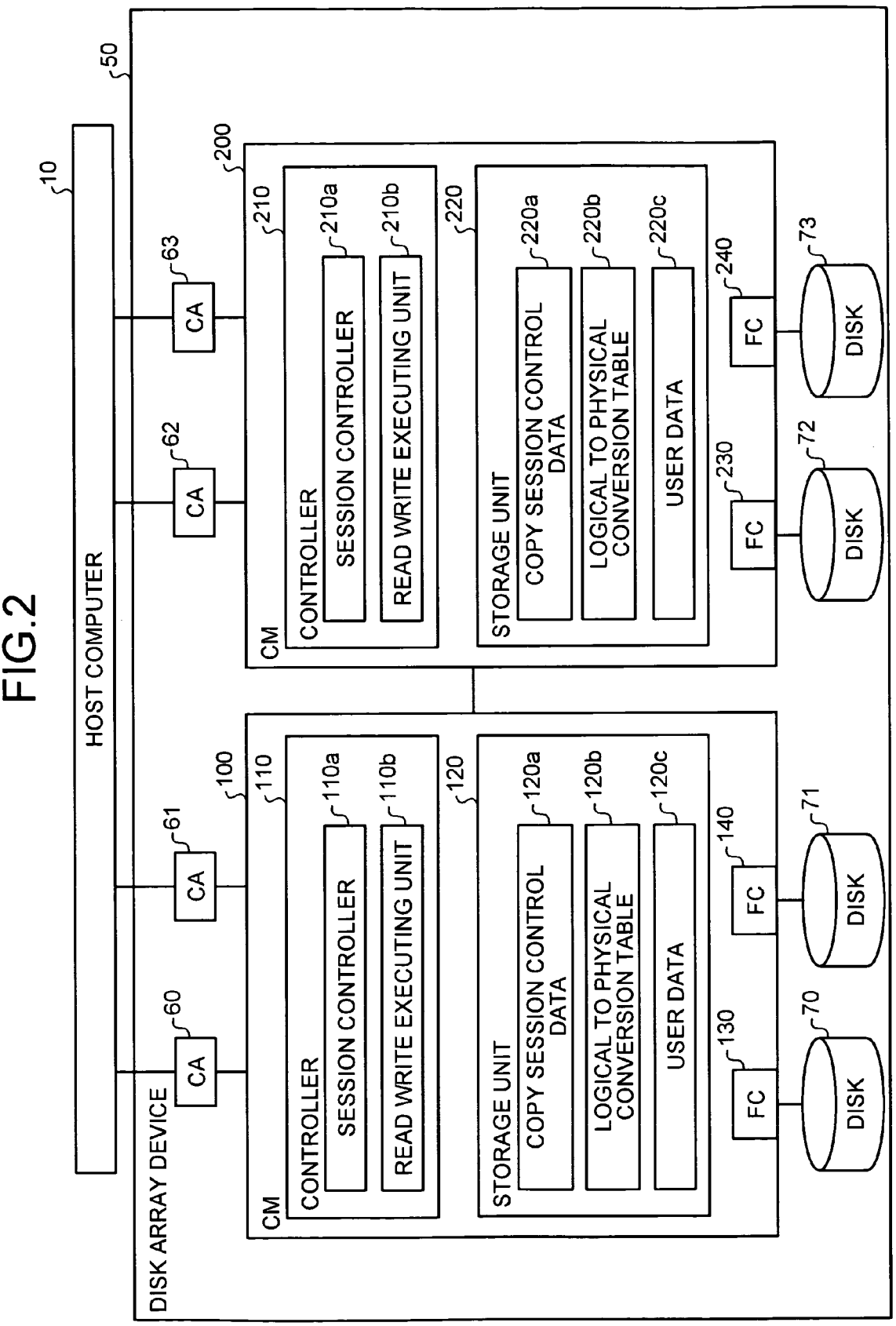
FIG. 2 is a block diagram of a disk array device according to an embodiment of the present invention.

FIG. 2 is a block diagram of a disk array device 50 according to an embodiment of the present embodiment. The disk array device 50 includes channel adaptors (CAs) 60 through 63, disks 70 through 73, and centralized modules (CMs) 100 and 200. The CAs 60 through 63 are connected to a host computer 10. The host computer 10 executes a write request that writes data or a read request that reads data for the disk array device 50.

The CAs 60 through 63 carry out data communication with the host computer 10 by using a predetermined protocol. The CA 60 and 61 are connected to the CM 100. The CA 62 and 63 are connected to the CM 200.

The CM 100 controls various processes such as the read process and the write process pertaining to data for the disks 70 and 71, a copying process between the disks 70 and 71 etc. The CM 200 controls various processes such as the read process and the write process pertaining to data for the disks 72 and 73, a copying process between the disks 72 and 73 etc. The disks 70 through 73 are storage devices that store data. Because the CM 100 and 200 have similar structure, the detail structure of only the CM 100 will explain below. Buses connect the CM 100 and the CM 200 to each other, thereby enabling the CM 100 to access the disks 72 and 73 and enabling the CM 200 to access the disks 70 and 71.

The CM 100 includes a controller 110, a storage unit 120, and fiber channels (FC) 130 and 140. The controller 110 executes the read process and the write process pertaining to data and the copying process for supporting the advanced copy function on the disks 70 through 73.

Figure 3:
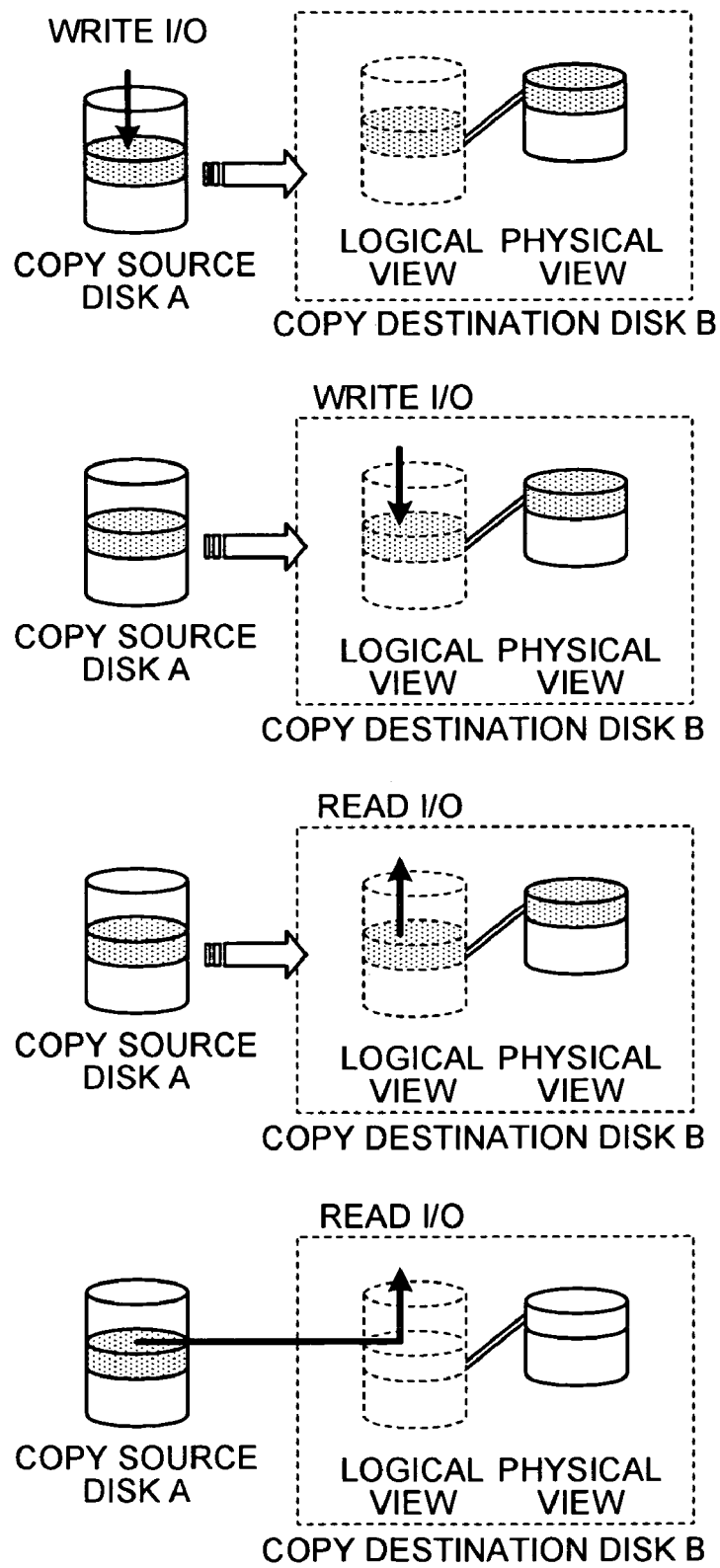
FIG. 3 is a schematic for explaining a copying process after session setting.

The copying process carried out by the controller 110 for supporting the advanced copy function is explained next. FIG. 3 is a schematic of the copying process after session setting. Copying is controlled in session units. A session is set by a specific command from the host computer 10.

In session setting, the copy source disk is linked with the copy destination disk and backup is carried out for the copy destination disk. In the conventional OPC, backup of the entire data is carried out after the copying process (entire backup method). However, in the present embodiment, instead of carrying out backup of the entire data, only the data space pertaining to the read request or the write request is subjected to backup after session setting. The data that is recorded in the copy destination disk is stored as backup in an external storage device (not shown) such as a tape.

As shown in the topmost first step of FIG. 3, upon receiving a write request pertaining to a copy source disk A (write i/o), the controller 110 extracts data for writing and records the extracted data in a free space of a copy destination disk B. After backup, the controller 110 executes a write process on the copy source disk A.

As shown in a second step from top of FIG. 3, upon fetching a write request pertaining to the copy destination disk B, the controller 110 determines whether data for writing (data for updating) exists in the copy destination disk B. If the data for writing exists in the copy destination disk B, the controller 110 writes data to the copy destination disk B.

If the data for writing does not exist in the copy destination disk B, the controller 110 copies the data for writing from the copy source disk A to the copy destination disk B, and carries out writing of data (updating of data) to the disk B.

As shown in a third step from top of FIG. 3, upon fetching a read request pertaining to the copy destination disk B, the controller 110 determines whether data for reading exists in the copy destination disk B. If the data for reading exists in the copy destination disk B, the controller 110 reads the data from the copy destination disk B and outputs the read data to the host computer 10.

As shown in a fourth step from top of FIG. 3, if the data for reading does not exist in the copy destination disk B (if the data for reading is not copied), the controller 110 reads the data for reading from the copy source disk A and outputs the read data to the host computer 10 without carrying out copying to the copy destination disk B.

Because backup data becomes meaningless due to deletion of link between a copy source and a copy destination, after deletion of session the controller 110 deletes the data that is copied from the copy source disk to the copy destination disk. Moreover, initialization of physical space is also desirable during setting of a new session.

Behavior of the copy destination disk B before session setting is explained next. FIG. 4 is a schematic pertaining to the behavior of the copy destination disk B before session setting. Before session setting, the controller 110 needs to write a disk specific identification data to the disk B to enable the host computer 10 to recognize the copy destination disk B.

As shown in the topmost first step of FIG. 4, when writing data (identification data pertaining to the disk B etc.) to the copy destination disk B before session setting, the controller 110 records the identification data in the free space of the disk B.

As shown in a second step from top of FIG. 4, upon receiving a read request (for example, read request pertaining to the identification data) pertaining to the copy destination disk B before session setting, the controller 110 reads data for reading from the disk B and outputs the read data to the host computer 10.

As shown in a third step from top of FIG. 4, if the data for reading does not exist in the copy destination disk B, the controller 110 outputs to the host computer 10 "0 data" that indicates that the data for reading does not exist in the copy destination disk B.

During a subsequent session setting or removal of session setting, the controller 110 does not delete the data that is written to the disk B before session setting to prevent deletion of the identification data that is written to the disk B before session setting.

A structure of the controller 110 that realizes the processes shown in FIG. 3 and FIG. 4 is explained next. As shown in FIG. 2, the controller 110 includes a session controller 110a and a read write executing unit 110b.

Upon receiving a session setting request from the host computer 10, the session controller 110a sets a session between the copy source disk and the copy destination disk that are subjected to session setting. The session setting request that is fetched from the host computer 10 includes the identification data of the copy source disk and the identification data of the copy destination disk. For example, if the identification data of the copy source disk is "disk 70" and the identification data of the copy destination disk is "disk 72", the session controller 110a sets a session between a disk 70 and a disk 72.

When setting the session, the session controller 110a generates copy session control data 120a and records the generated copy session control data 120a in the storage unit 120. The copy session control data 120a is data for controlling the session that is set between the copy source disk and the copy destination disk.

Figures 5, 6:
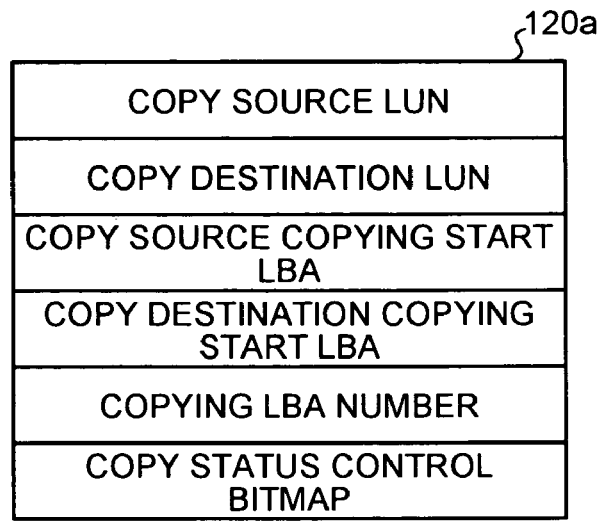
FIG. 5 is a schematic for explaining an example of contents of copy session control data.
FIG. 6 is a schematic for explaining an example of contents of a logical to physical conversion table.

FIG. 5 is a schematic of an example of the copy session control data 120a. As shown in FIG. 5, the copy session control data 120a includes a copy source Logical Unit Number (LUN), a copy destination LUN, a copy source copying start Logical Block Address (LBA), a copy destination copying start LBA, a copying LBA number, and a copy status control bit map.

The copy source LUN is a logical unit number pertaining to the copy source disk. The copy destination LUN is a logical unit number pertaining to the copy destination disk. For example, recording the logical unit number (identification data) of the disk 70 in the copy source LUN and recording the logical unit number of the disk 72 in the copy destination LUN links the disk 70 and the disk 72 with each other (sets a session).

The copy source copying start LBA is data that specifies a start address of a set of data for copying from the copy source disk. Upon fetching a write request from the host computer 10, the session controller 110a specifies the start address of the data, and records the specified start address in the copy source copying start LBA.

The copy destination copying start LBA is data that specifies a start address for copying the set of data in the copy destination disk. The session controller 110a detects the start address for copying the set of data in the copy destination disk and records the detected start address in the copy destination copying start LBA.

The copying LBA number is data that indicates a number of data in the set of data for copying. Upon fetching a write request from the host computer 10, the session controller 110a counts number of data in the set of data for copying and records the counted number in the copying LBA number. The copy status control bit map stores data for controlling copy status of data.

Returning to FIG. 2, the read write executing unit 110b carries out reading or writing of data for a disk according to a read request or a write request respectively from the host computer 10. The read write executing unit 110b records in the storage unit 120 as user data 120c data for writing that is fetched from the host computer 10 or data that is read from the disks 70 through 73.

When executing reading or writing of data pertaining to the copy source disk or the copy destination disk, the read write executing unit 110b carries out backup of data by using a logical to physical conversion table 120b. The logical to physical conversion table 120b includes data pertaining to a correspondence between logical LBA and physical LBA in the copy destination disk and data before and after session setting.

FIG. 6 is a schematic of an example of the logical to physical conversion table 120b. As shown in FIG. 6, the logical to physical conversion table 120b includes a logical LBA, a physical LBA, and a write identifier. For example, in a second row from top, a logical LBA "1" corresponds to a physical LBA "1" when a session is set between a copy source and a copy destination (in other words, after setting).

As shown in a first row from top of FIG. 6, a physical LBA corresponding to a logical LBA "0" is indicated by "-". In other words, data pertaining to logical LBA "0" is not copied from the copy source disk to the copy destination disk.

A process pertaining to the read write executing unit 110b is explained in detail. The read write executing unit 110b executes a write process pertaining to the copy source disk, a write process pertaining to the copy destination disk, a read process pertaining to the copy source disk, and a read process pertaining to the copy destination disk.

The write process pertaining to the copy source disk that is carried out by the read write executing unit 110b is explained first. Upon fetching the write request pertaining to the copy source disk from the host computer 10, based on the copy session control data 120a, the read write executing unit 110b determines whether a session is set.

If the session is not set, the read write executing unit 110b writes to the copy source disk data that is fetched from the host computer 10. If the session is set, the read write executing unit 110b determines whether a data space for writing data is an uncopied data space. If the data space for writing data is not an uncopied data space, the read write executing unit 110b writes data to the copy source disk.

If the data space for writing data is an uncopied data space, the read write executing unit 110b copies the data that is recorded in the data space to the copy destination disk, and writes data to the copy source disk.

The write process pertaining to the copy destination disk that is carried out by the read write executing unit 110b is explained next. Upon receiving a write request pertaining to the copy destination disk from the host computer 10, based on the copy session control data 120a, the read write executing unit 110b determines whether a session is set.

If the session is not set, the read write executing unit 110b detects a free space in the copy destination disk, and sequentially writes data from the head address of the detected free space (in other words, records data in the copy destination disk by forward filling).

If the session is set, the read write executing unit 110b determines whether data for writing exists in the copy destination disk. If the data for writing exists in the copy destination disk, the read write executing unit 110b writes data to the copy destination disk.

If the data for writing does not exist in the copy destination disk, the read write executing unit 110b extracts the data for writing from the copy source disk, and after copying the extracted data for writing in the copy destination disk writes data to the copy destination disk.

The read process pertaining to the copy source disk that is carried out by the read write executing unit 110b is explained next. During the read process pertaining to the copy source disk, regardless of whether a session is set, the read write executing unit 110b searches data for reading from the copy source disk and outputs the searched data to the host computer 10.

The read process pertaining to the copy destination disk that is carried out by the read write executing unit 110b is explained next. Upon fetching a read request pertaining to the copy destination disk from the host computer 10, based on the copy session control data 120a, the read write executing unit 110b determines whether a session is set.

If the session is not set, the read write executing unit 110b searches data for reading from the copy destination disk, and outputs the searched data to the host computer 10. If the data for reading does not exist in the copy destination disk, the read write executing unit 110b outputs to the host computer 10 "0 data" that indicates that the data for reading does not exist.

If the session is set, the read write executing unit 110b searches the data for reading from the copy destination disk and outputs the searched data to the host computer 10. If the data for reading does not exist in the copy destination disk, the read write executing unit 110b searches the data for reading from the copy source disk and outputs the searched data to the host computer 10.

The controller 110 accesses the disks 70 through 73 that serve as copy source disks or copy destination disks via the FC 130 through 133 that are shown in FIG. 2. The FC 130 through 133 use a predetermined protocol to carry out data communication with each of the disks 70 through 73.

Figure 7:
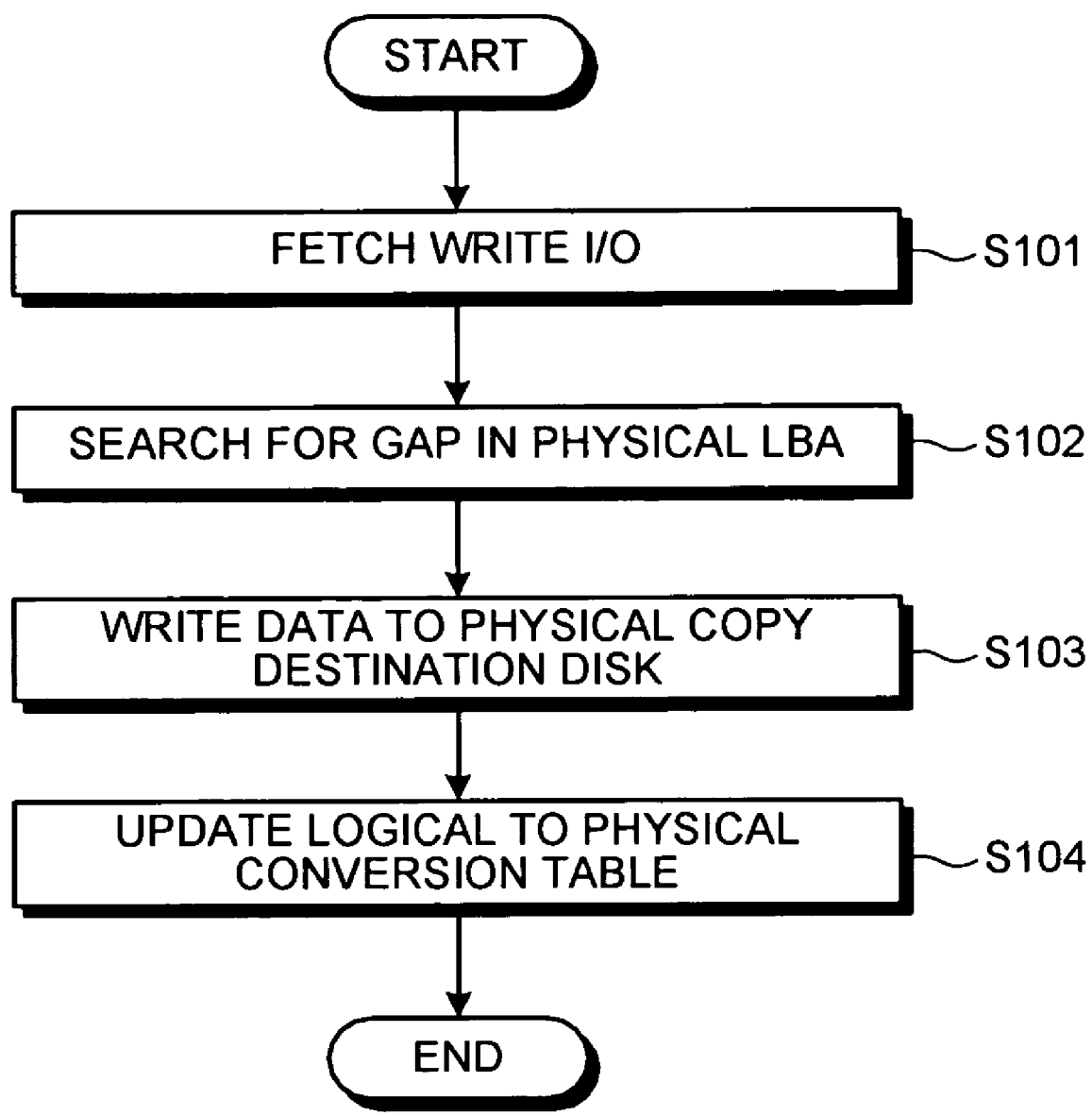
FIG. 7 is a flowchart of a process when the controller fetches a write request pertaining to the copy destination disk before session setting.

The processes that are carried out by the controller 110 according to the present embodiment are explained next by using a flowchart. FIG. 7 is a flowchart of a process when the controller 110 fetches a write request pertaining to the copy destination disk before session setting.

As shown in FIG. 7, the controller 110 fetches the write request (write i/o) pertaining to the copy destination disk from the host computer 10 (step S101) and searches for a gap in the physical LBA pertaining to the copy destination disk (step S102).

The controller 110 writes data to the physical copy destination disk (step S103) and updates the logical to physical conversion table 120b (step S104). When writing data to the copy destination disk, the controller 110 sequentially writes data beginning from a data free space having the smallest address. During updating of the logical to physical conversion table 120b at step S104, the controller 110 records in the logical to physical conversion table 120b a correspondence between a logical LBA and a physical LBA pertaining to the written data and records the write identifier as before session setting.

Thus, the controller 110 writes data (disk identification data etc.) to the copy destination disk before session setting, thereby enabling the host computer 10 to appropriately identify the copy destination disk.

Figure 8:
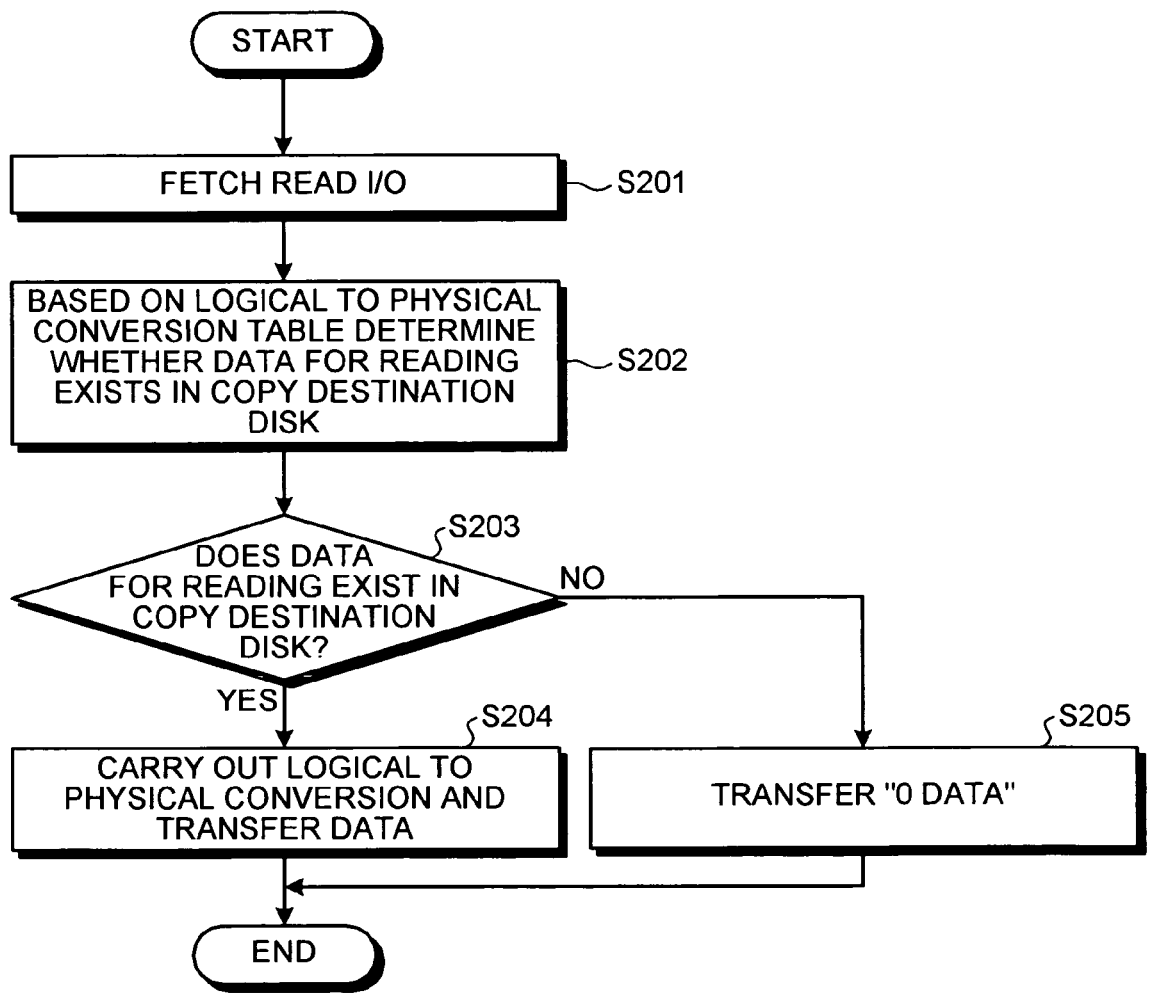
FIG. 8 is a flowchart of a process when the controller fetches a read request pertaining to the copy destination disk before session setting.

A process when the controller 110 fetches a read request pertaining to the copy destination disk before session setting is explained next. FIG. 8 is a flowchart of the process when the controller 110 fetches a read request pertaining to the copy destination disk before session setting.

As shown in FIG. 8, the controller 110 fetches the read request (read i/o) pertaining to the copy destination device from the host computer 10 (step S201), and based on the logical to physical conversion table 120b, determines whether data for reading exists in the copy destination disk (step S202).

If the data for reading exists in the copy destination disk ("Yes" at step S203), the controller 110 carries out a logical to physical conversion and transfers the data for reading to the host computer 10 (step S204). If the data for reading does not exist in the copy destination disk ("No" at step S203), the controller 110 transfers "0 data" to the host computer 10 (step S204).

Thus, based on the logical to physical conversion table 120b, the controller 110 can fetch data from the copy destination disk even before session setting and transfer the data to the host computer 10.

Figure 9:
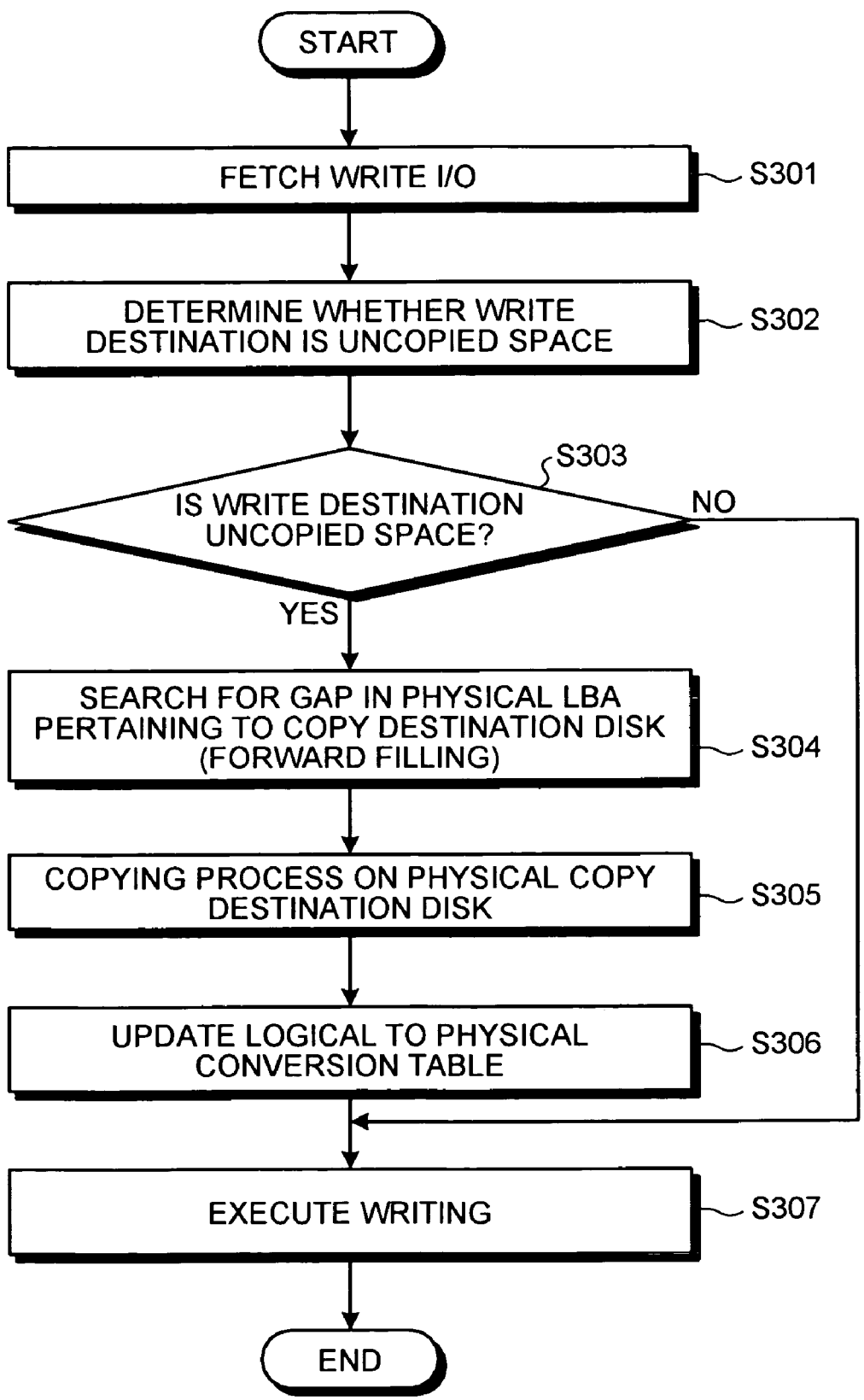
FIG. 9 is a flowchart of a process when the controller fetches the write request pertaining to a copy source disk after session setting.

A process when the controller 110 fetches the write request pertaining to the copy source disk after session setting is explained next. FIG. 9 is a flowchart of the process when the controller 110 fetches the write request pertaining to the copy source disk after session setting.

As shown in FIG. 9, the controller 110 fetches the write request (write i/o) pertaining to the copy source disk from the host computer 10 (step S301) and determines whether a write destination of data is an uncopied space (step S302).

If the write destination of data is an uncopied space ("Yes" at step S303), the controller 110 searches for a gap in the physical LBA pertaining to the copy destination disk (step S304), and executes a copying process on the physical copy destination disk (step S305). During the copying process at step S305, the controller 110 extracts data pertaining to the uncopied space from the copy source disk, and sequentially writes the extracted data in the free space of the copy destination disk beginning from a free space having the smallest address.

Next, the controller 110 updates the logical to physical conversion table 120b (step S306). During updating of the logical to physical conversion table 120b at step S306, the controller 110 records in the logical to physical conversion table 120b a correspondence between a logical LBA and a physical LBA pertaining to the written data and records the write identifier as after session setting.

Next, the controller 110 writes data to the copy source disk (step S307). If the write destination of data is not an uncopied space ("No" at step S303), the process moves to step S307.

Thus, after session setting, the controller 110 fetches the write request pertaining to the copy source disk, and if data for writing is uncopied, copies data from the uncopied space to the copy destination disk, thereby enabling to support the advanced copy function even if a capacity of the copy destination disk is smaller than the capacity of the copy source disk.

Figure 10:
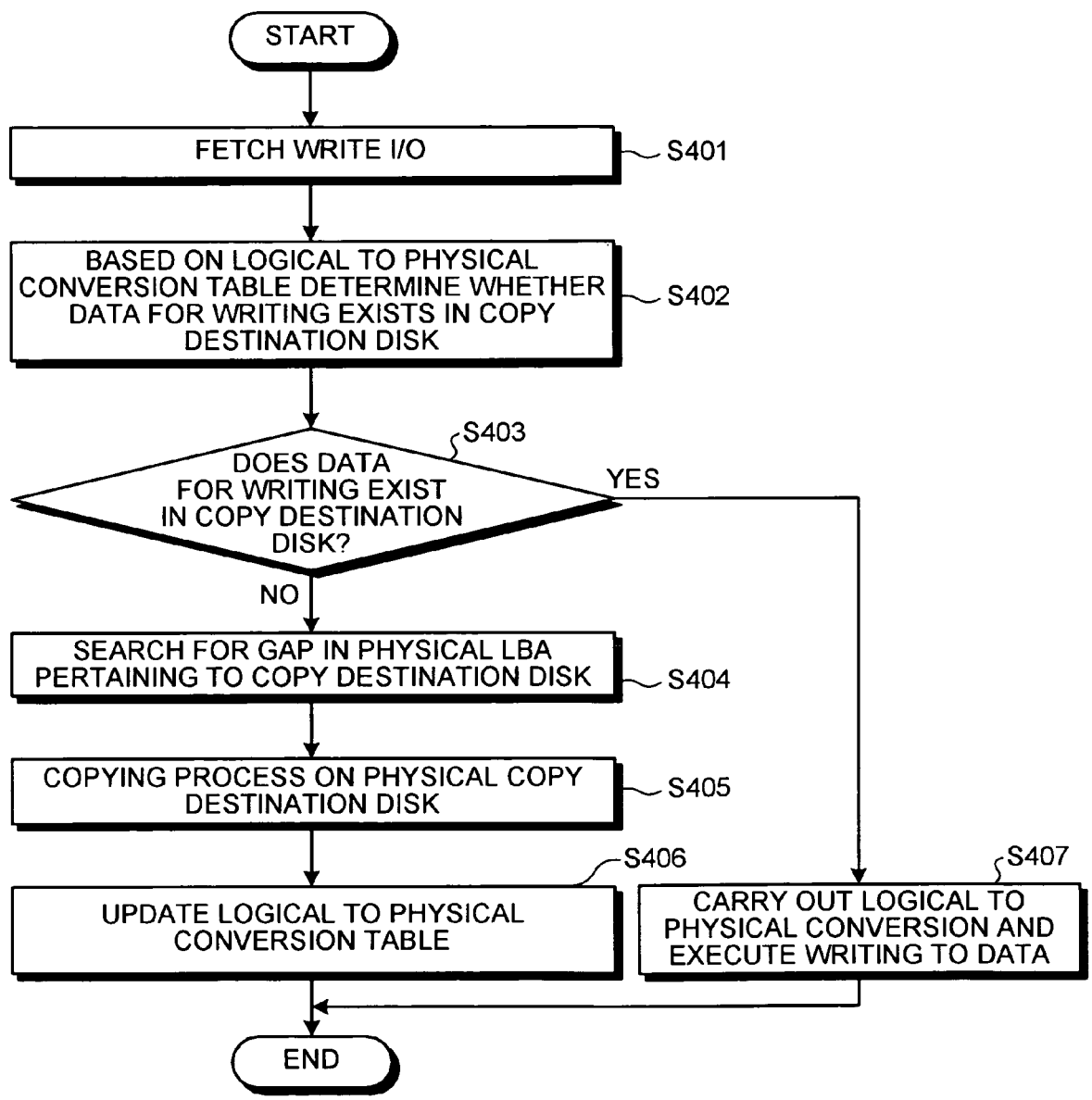
FIG. 10 is a flowchart of a process when the controller fetches the write request pertaining to the copy destination disk after session setting.

A process when the controller 110 fetches the write request pertaining to the copy destination disk after session setting is explained next. FIG. 10 is a flowchart of the process when the controller 110 fetches the write request pertaining to the copy destination disk after session setting.

As shown in FIG. 10, the controller 110 fetches the write request (write i/o) pertaining to the copy destination disk from the host computer 10 (step S401) and based on the logical to physical conversion table 120b determines whether data for writing exists in the copy destination disk (step S402).

If the data for writing does not exist in the copy destination disk ("No" at step S403), the controller 110 searches for a gap in the physical LBA pertaining to the copy destination disk (step S404) and executes a copying process on the physical copy destination disk (step S405). When executing the copying process at step S405, the controller 110 searches the data for writing from the copy source disk, and copies the searched data in the free space of the copy destination disk. When copying the data in the copy destination disk, the controller 110 sequentially executes copying beginning from the head address of the free space.

Next, the controller 110 updates the logical to physical conversion table 120b (step S406). During updating of the logical to physical conversion table 120b at step S406, the controller 110 records in the logical to physical conversion table 120b a correspondence between a logical LBA and a physical LBA and records the write identifier as after session setting.

If the data for writing exists in the copy destination disk ("Yes" at step S403), the controller 110 carries out a logical to physical conversion and executes writing to the data (step S407).

Thus, the controller 110 fetches the write request pertaining to the copy destination disk after session setting. If the data for writing does not exist in the copy destination disk, the controller 110 extracts the data for writing from the copy source disk, records the extracted data in the copy destination disk, and executes writing of data, thereby enabling to efficiently execute writing of data to the copy destination disk even if the data for writing does not exist in the copy destination disk.

Figure 11:
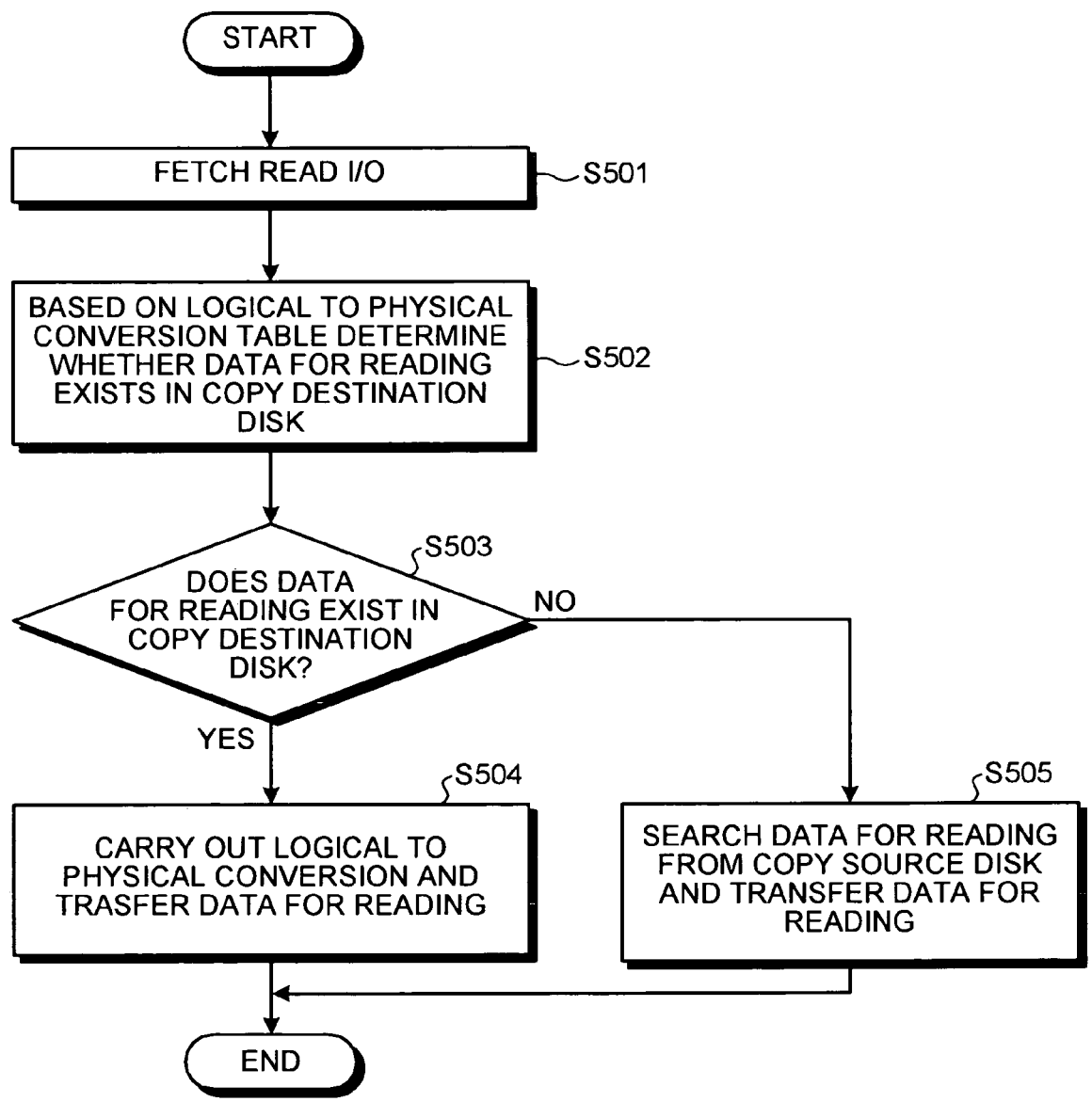
FIG. 11 is a flowchart of a process when the controller fetches the read request pertaining to the copy destination disk after session setting.

A process when the controller 110 fetches a read request pertaining to the copy destination disk after session setting is explained next. FIG. 11 is a flowchart of the process when the controller 110 fetches a read request pertaining to the copy destination disk after session setting.

As shown in FIG. 11, the controller 110 fetches the read request (read i/o) pertaining to the copy destination disk from the host computer 10 (step S501), and based on the logical to physical conversion table 120b determines whether data for reading exists in the copy destination disk (step S502).

If the data for reading exists in the copy destination disk ("Yes" at step S503), the controller 110 carries out a logical to physical conversion and transfers the data for reading to the host computer 10 (step S504).

If the data for reading does not exist in the copy destination disk ("No" at step S503), the controller 110 searches the data from the copy source disk, and transfers the searched data to the host computer 10 (step S505).

Thus, if the data for reading does not exist in the copy destination disk, the controller 110 searches the data for reading from the copy source disk and transfers the searched data to the host computer 10, thereby enabling to use as the copy destination disk a disk having a smaller data capacity than the data capacity of the copy source disk even when supporting the advanced copy function.

Figure 12:
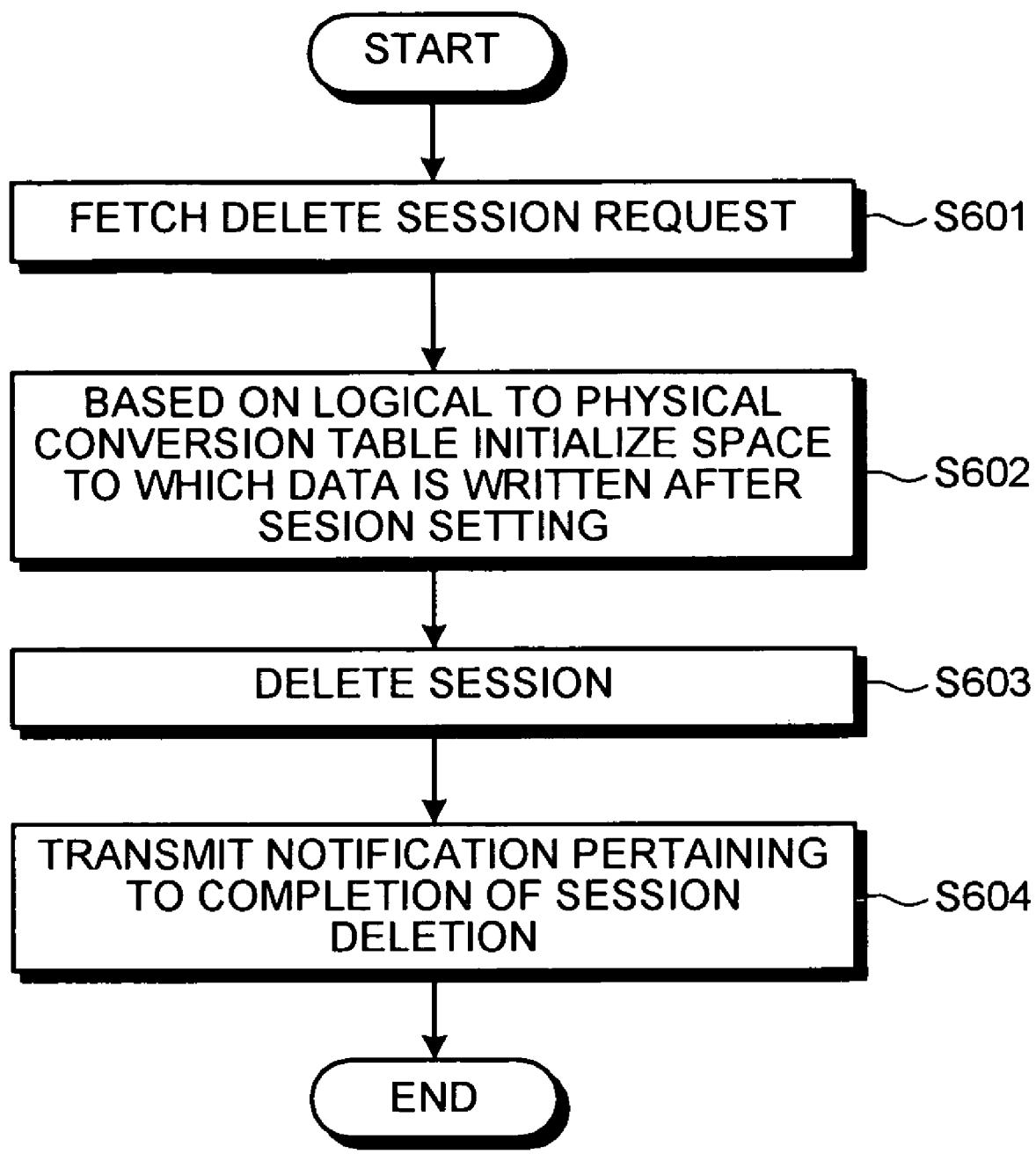
FIG. 12 is a flowchart of a process when the controller fetches a delete session request.

A process when the controller 110 fetches a delete session request from the host computer 10 is explained next. FIG. 12 is a flowchart of the process when the controller 110 fetches the delete session request.

As shown in FIG. 12, the controller 110 fetches the delete session request from the host computer 10 (step S601), and based on the logical to physical conversion table 120b, initializes the space to which data is written after session setting (step S602). The controller 110 initializes at step S602 the data corresponding to the physical LBA when the write identifier pertaining to the logical to physical conversion table 120b is "after setting", and modifies the write identifier to "before setting".

Next, the controller 110 deletes session (step S603) and transmits a notification pertaining to completion of session deletion to the host computer 10 (step S604).

Thus, upon fetching a delete session request from the host computer 10, the controller 110 deletes data that is written to the copy destination disk after session setting, thereby enabling to efficiently reuse the disk having the initialized data as the copy destination disk.

Thus, in the disk array device 50 according to the present embodiment, the controller 110 sets a session pertaining to the copy source disk and the copy destination disk, and without copying the entire data that is recorded in the copy source disk to the copy destination disk, copies to the copy destination disk only the data that is recorded in a data space that includes data for writing. Further, if data for reading does not exist in the copy destination disk, the controller 110 searches the data for reading from the copy source disk and transfers the searched data to the host computer 10, thereby removing the necessity of providing the same storage capacity for the copy source disk and the copy destination disk, thus enabling to support the advanced copy function and to reduce the cost pertaining to a copy destination storage device.

Figure 13:
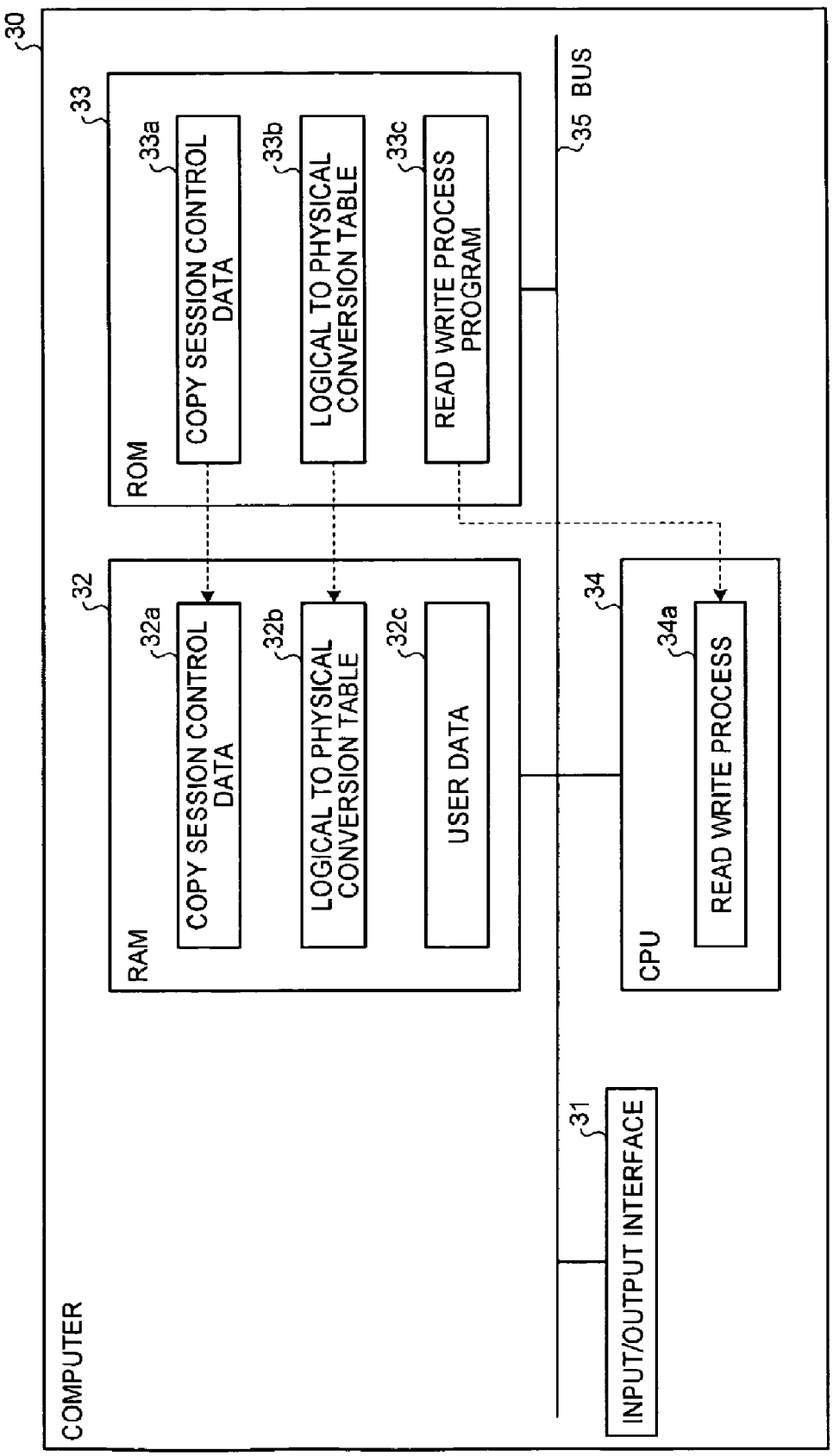
FIG. 13 is a schematic of a computer that implements the method according to the embodiment.
Figure 14:
FIG. 14 is a schematic for explaining the conventional advanced copy function.

Various processes pertaining to the controller (disk array device) that is explained in the embodiment can be realized by executing a program pertaining to a read write process using a computer. An example of a computer, which executes a read write process program that includes functions similar to the controller according to the embodiment, is explained next with reference to FIG. 13. FIG. 13 is a schematic of the computer that executes the read write process program.

As shown in FIG. 13, a computer 30 includes an input output interface 31, a Random Access Memory (RAM) 32, a Read Only Memory (ROM) 33, and a Central Processing Unit (CPU) 34 that are connected by buses 35. The input output interface 31 is an input device such as a keyboard, and serves as an interface for connecting the host computer 10 that is shown in FIG. 2, a disk device etc.

The RAM 32 is a recording device that records copy session control data 32a, a logical to physical conversion table 32b, and user data 32c. The copy session control data 32a, the logical to physical conversion table 32b, and the user data 32c correspond respectively to the copy session control data 120a, the logical to physical conversion table 120b, and the user data 120c that are shown in FIG. 2.

The read write process program that includes similar functions as the controller according to the embodiment is stored beforehand in the ROM 33 of the computer 30. In other words, as shown in FIG. 13, a read write process program 33c is stored beforehand in the ROM 33. Copy session control data 33a and a logical to physical conversion table 33b are also recorded in the ROM 33. The CPU 34 reads the copy session control data 33a and the logical to physical conversion table 33b from the RAM 32.

The CPU 34 reads the read write process program 33c from the ROM 33 and executes the read write process program 33c, thereby enabling the read write process program 33c to function as a read write process 34a. The CPU 34 uses various types of data that is recorded in the RAM 32 to write to the copy destination disk the data that is recorded in the copy source disk.

According to the present invention, upon fetching an update request pertaining to data, a controller extracts data for updating from data that is recorded by a copy source recording device, and copies the extracted data in a copy destination recording device that is physically smaller than a recording space of the copy source recording device, thereby removing the necessity to use a copy destination disk having an equivalent storage space as the amount of data that is recorded in a copy source disk, thus enabling to economize on data recording space of the copy destination disk and to reduce the cost.

According to the present invention, the controller generates logical to physical correspondence data that establishes a correspondence between a logical address and a physical address pertaining to data that is recorded by the copy destination recording device, thereby enabling to appropriately control the data that is recorded in the copy destination recording device.

According to the present invention, upon fetching a read request to read data from the copy destination recording device, based on the logical to physical correspondence data, the controller determines whether data for reading exists in the copy destination recoding device. If the data for reading does not exist in the copy destination recording device, the controller searches the data for reading from the copy source recording device, and outputs the searched data, thereby enabling to efficiently respond to the read request even if copy destination data is economized.

According to the present invention, upon fetching an update request pertaining to data in the copy destination recording device, based on the logical to physical correspondence data, the controller determines whether data for updating exists in the copy destination recording device. If the data for updating does not exist in the copy destination recording device, the controller records the data for updating in the copy destination recording device from a recording device in which the data for updating is recorded, and updates the data for updating that is recorded by the copy destination recording device, thereby enabling to appropriately update the data for updating even if data capacity of a copy destination is minimized.

According to the present invention, upon fetching the update request pertaining to data, a copy control method extracts data for updating from data that is recorded by the copy source recording device, and copies the extracted data in the copy destination recording device that is physically smaller than the recording space of the copy source recording device, thereby removing the necessity to use the copy destination disk having an equivalent storage space as the amount of data that is recorded in the copy source disk, thus enabling to economize on data recording space of the copy destination disk and to reduce the cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A controller that controls copying of data from a source medium to a destination medium, the destination medium having a logical storage capacity equivalent to that of the source medium and a physical storage capacity smaller than that of the source medium,
   an extracting unit that extracts data to be updated from an area containing the data within the source medium, wherein the data to be updated within the source medium are backed-up in the destination medium; and
   a copying unit that searches for a free space in the destination medium and copies the data extracted by the extracting unit from the source medium to the free space in the destination medium in such a manner as to copy the thus extracted data sequentially into an area beginning from a head address of the free space in the destination medium;
   wherein the controller further comprises:
   a first determining unit that determines, upon fetching a read request to read first data from the destination medium, whether the first data exists in the destination medium based on the logical to physical correspondence data;
   an acquiring unit that acquires, upon the first determining unit determining that the first data does not exist in the destination medium, the first data from the source medium and outputs retrieved first data;
   a second determining unit that determines, upon fetching an update request to update second data in the destination medium, whether the second data exists in the destination medium based on the logical to physical correspondence data; and
   an updating unit that copies, upon the second determining unit determining that the second data does not exist in the destination medium, the second data from a recording device in which the second data exists to the destination medium thereby updating contents of the destination medium.

2. The controller according to claim 1, wherein the logical to physical correspondence data is generated by the copying unit, so as to establish a correspondence between logical addresses and physical addresses of data in the destination medium.

3. A method of controlling copying of data from a source medium to a destination medium, the destination medium having a logical storage capacity equivalent to that of the source medium and a physical storage capacity smaller than that of the source medium, the method comprising:
   extracting data to be updated from an area containing the data within the source medium, wherein the data to be updated within the source medium are backed-up in the destination medium; and
   searching for a free space in the destination medium and copying the extracted data to be updated from the source medium to the free space in the destination medium in such a manner as to copy the thus extracted data sequentially into an area beginning from a head address of the free space in the destination medium;
   wherein the method further comprises:
   first determining, upon fetching a read request to read first data from the destination medium, whether the first data exists in the destination medium based on a logical to physical correspondence data;
   acquiring, upon determining at the first determining that the first data does not exist in the destination medium, the first data from the source medium and outputting retrieved first data;
   second determining, upon fetching an update request to update second data in the destination medium, whether the second data exists in the destination medium based on the logical to physical correspondence data; and
   copying, upon determining at the second determining that the second data does not exist in the destination medium, the second data from a recording device in which the second data exists to the destination medium thereby updating contents of the destination medium.

4. The method according to claim 3, wherein the generating logical to physical correspondence data is included in the searching, so as to establish a correspondence between logical addresses and physical addresses of data in the destination medium.

5. A computer-readable recording medium that stores therein a computer program that implements on a computer a method of controlling copying of data from a source medium to a destination medium, the destination medium having a logical storage capacity equivalent to that of the source medium and a physical storage capacity smaller that that of the source medium, the computer program causing the computer to execute:
   extracting data to be updated from an area containing the data within the source medium, wherein the data to be updated within the source medium are backed-up in the destination medium; and
   searching for a free space in the destination medium and copying the extracted data to be updated from the source medium to the free space in the destination medium in such a manner as to copy the thus extracted data sequentially into an area beginning from a head address of the free space in the destination medium;
   wherein the method further comprises:
   first determining, upon fetching a read request to read first data from the destination medium, whether the first data exists in the destination medium based on a logical to physical correspondence data;
   acquiring, upon determining at the first determining that the first data does not exist in the destination medium, the first data from the source medium and outputting retrieved first data;
   second determining, upon fetching an update request to update second data in the destination medium, whether the second data exists in the destination medium based on the logical to physical correspondence data; and
   copying, upon determining at the second determining that the second data does not exist in the destination medium, the second data from a recording device in which the second data exists to the destination medium thereby updating contents of the destination medium.

6. The computer-readable recording medium according to claim 5, wherein generating the logical to physical correspondence data is included in the searching, so as to establish a correspondence between logical addresses and physical addresses of data in the destination medium.

* * * * *